Feb. 23, 1960
W. F. ENGEL ET AL
2,926,135
PROCESS FOR DECOLORIZING A HYDROCARBON
OIL USING AN ALUMINA ADSORBENT
Filed May 23, 1957
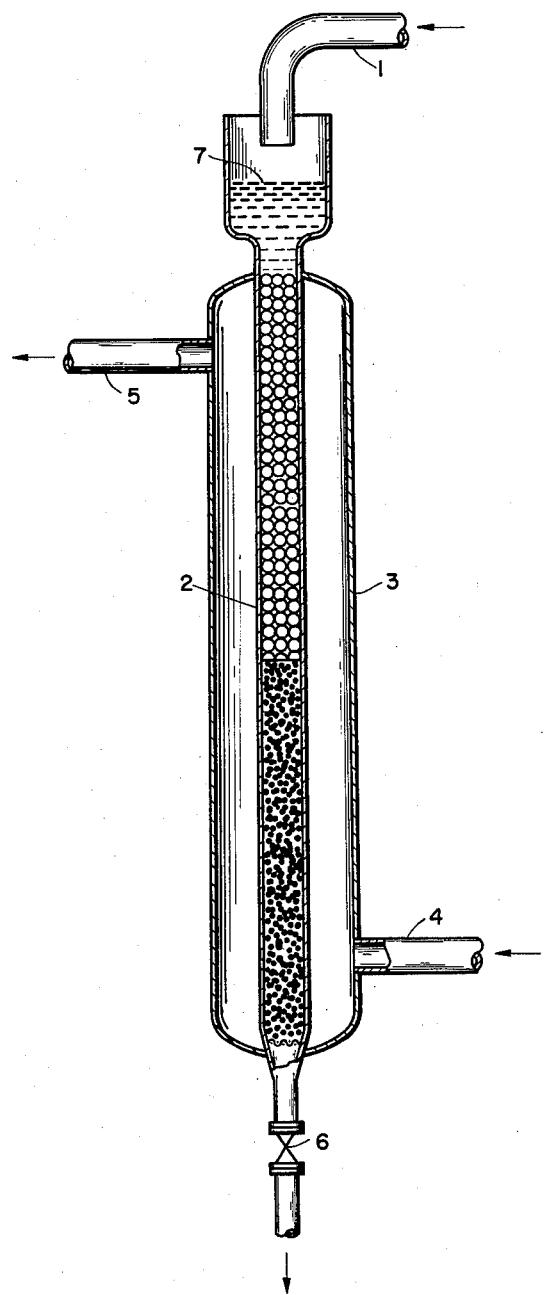
INVENTORS:
WILLEM FREDERIK ENGEL
PIETER KRIJGER
BY:
THEIR ATTORNEY

2,926,135

Patented Feb. 23, 1960

2,926,135

PROCESS FOR DECOLORIZING A HYDROCARBON OIL USING AN ALUMINA ADSORBENT

Willem Frederik Engel and Pieter Krijger, Amsterdam, Netherlands, assignors to Shell Development Company, New York, N.Y., a corporation of Delaware Application May 23, 1957, Serial No. 661,094

Claims priority, application Netherlands July 30, 1956

12 Claims. (Cl. 208—306)

This invention relates to an improved method of refining hydrocarbon oils, such as lubricating oils, by means of an alumina-based adsorbent. It also relates to an improved method of preparing such adsorbents.

Hydrocarbon oils, such as lubricating oil, may be refined in order to improve their color, oxidation stability, etc., by means of an adsorbent. For example, a lubricating oil may be continuously passed at a temperature of 135–200° C. through a percolation tower wherein it contacts a suitable adsorbent. In this type of operation, the spent adsorbent is usually liberated from most of the adherent oil by washing with gasoline after which it is steamed and finally passed to a regenerator where the remaining carbonaceous material is burned off. After cooling the regenerated adsorbent may be returned to the percolation tower.

The adsorbent used should have good decolorizing activity, mechanical strength and regenerability. Fuller's earth has the latter two properties, but the activity of this adsorbent rapidly declines during the process. Surinam bauxite has an excellent decolorizing activity and also retains this activity for a fairly long time, but its mechanical strength is insufficient, and this may give rise to the formation of undesirably large quantities of dust. This formation of dust generally occurs as a result of several factors, e.g. the contact of the adsorbent with the oil, the mechanical wear of the adsorbent during the transport thereof, the contact of the adsorbent with steam at a high temperature, and the burning-off of oil residues from the adsorbent in the regenerator. It is clear that, particularly in the case of a continuous process, the quantity of dust formed should be as small as possible in order to prevent clogging and other breakdowns in the plant.

An attempt has already been made to increase the mechanical strength of bauxite. For example, U.S. Patent 2,622,860 discloses reinforced alumina formed pieces which are prepared by mixing a powder of an uncalcined non-activated natural or synthetic alumina containing water of hydration with an aqueous solution of an aluminum salt, and shaping the paste obtained by compressing into strands or pellets. After drying, and if desired, after cutting up, the material is heated to above 200° C. to obtain formed pieces which are suitable as catalyst carriers. However, they are not suitable in this form as an adsorbent, since if the resultant strands or pellets are ground to obtain a maximum number of particles of 0.25 to 5 mm., necessary for use as an adsorbent, the yield of suitable products is still only approximately 30%. Moreover, the resultant particles are so mechanically weakened that when used as an adsorbent a large quantity of dust is again formed.

The present invention provides a means to attain the objectives which are apparent from the foregoing description of deficiencies of the prior art and it will be described in detail, with reference in part to the accompanying drawing wherein the sole figure is a schematic representation of apparatus used to contact a specific lubricating oil with an adsorbent produced according to this invention and with other adsorbents for comparison purposes in order to examine their decolorizing activity.

It has now been found that a very good adsorbent may be obtained which has both a good decolorizing activity and regenerability, as well as an excellent mechanical strength, if the uncalcined, non-activated alumina starting material containing water of hydration is used not as a powder but in the particle size suitable for use as adsorbent, i.e. 0.25 to 5 mm., and this starting material is impregnated with a quantity of aqueous solution of an aluminum salt which is sufficient to entirely fill the pores of the alumina particles. The impregnation is carried out in such a manner that the particles are capable of moving substantially freely wth respect to each other and the particles are then dried and heated to a temperature above 200° C.

The quantity of the aqueous solution of an aluminum salt by means of which impregnation is preferably effected, may be simply determined in the following way:

A sample of the dry alumina is moistened with a quantity of solution while vigorously stirring. As a result the particles first show a tendency to agglomerate but when stirred well the particles very quickly again move freely with respect to each other. On the addition of a further quantity of solution the same phenomenon is observed. When despite vigorous stirring the particles no longer move entirely freely with respect to each other, the desired quantity of solution to be added has already been exceeded.

The preferred starting material is a natural alumina containing 3 mols of water per mol of $Al_2O_3$, since this generally has the greatest adsorptive surface after heating, and the preferred particle size of the adsorbent is 0.5–1.5 mm.

The aqueous solution of an aluminum salt which may, for example, be used is an aqueous solution of aluminum chloride, aluminum sulphate, aluminum nitrate and the like. An organic solvent such as methanol may be present in the solution in addition to water.

Good results are obtained when, after drying the alumina, 0.2–0.6% by weight, preferably approximately 0.4% by weight, of aluminum is present therein in the form of a salt.

The impregnated particles may be dried by heating them to a temperature of 100–150° C., preferably approximately 120° C., at which temperature they are kept for a period sufficient to expel most of the water, e.g. 5 hours. It is obvious that other drying methods may also be used.

The heating which takes place after drying is generally effected at high temperatures, preferably at first to temperatures of between 200° C. and 300° C. at which the water of hydration is just expelled, and then for some hours to temperatures between 400° C. and 800° C.

British patent specifications 445,727 and 445,757 disclose a method of preparing catalyst by impregnating bauxite particles with an aqueous solution of aluminum chloride in which the $AlCl_3$ is the catalytically active component and the bauxite acts as a carrier. However, unlike applicants' process, the bauxite is activated prior to impregnation by grinding it, adding water thereto (or grinding in the presence of water), and then heating it at a red heat. As will be illustrated in the following example, the mechanical strength of the resultant particles is too small for satisfactory use as an absorbent in an adsorption refining process.

EXAMPLE

White Surinam bauxite having a particle size of 0.59–1.3 mm. was impregnated with 12.0% by weight of an aqueous aluminum chloride solution with a content of 167 grams of $AlCl_3$ per kg. of solution. The impregnation was carried out in such a way that the solution was completely absorbed while still allowing the particles of the bauxite to move freely with respect to each other. After drying the mass contained 2% by weight of $AlCl_3$. The dried particles were heated to 250° C. in 3 hours and kept for 2 hours at this temperature, then heated for 2 hours to 500° C., and finally kept at this temperature for 2 hours. During the heating operation 200 liters of air per liter of bauxite per hour were passed through the mass.

The bauxite treated in this way was found to have a surface area of 197 sq. m. per gram and a chlorine content of 0.5% by weight.

The product obtained (sample No. I) was now subjected to various treatments in order to assess the mechanical strength, while a number of other products were treated in the same way for comparison.

The comparison material used was:

Sample No. II—White Surinam bauxite heated in the same way as sample No. I, but without previous impregnation with $AlCl_3$.

Sample No. III—Same as sample No. II, but after heating, it was impregnated with $AlCl_3$ (up to 2% by weight of $AlCl_3$, based on bauxite) and then again heated in the manner described above (cf. British patent specification 445,727).

Sample No. IV—Fuller's earth, after heating to 500° C. while passing through 200 liters of air per liter of fuller's earth per hour.

Sample No. V—Same as sample No. I, but after heating, it was treated with a mixture of steam and air for 4 hours at 500° C. and atmospheric pressure. The flow rate was 200 liters of air and 100 grams of steam per liter of bauxite per hour.

Sample No. VI—Same as sample No. I, but impregnated with 13.9% by weight of an aqueous aluminum nitrate solution with a content of 230 grams of $Al(NO_3)_3$ per kg. of solution, so that after drying 3.2% by weight of $Al(NO_3)_3$, based on the bauxite, was present in the particles.

The above-mentioned samples (I–VI) were successively subjected to the following treatments:

(a) The sample was contacted with a Venezuelan lubricating oil for half an hour at 170° C. without stirring. After cooling and washing with cleaning spirit and drying, the quantity of dust formed (particles of a size of less than 0.2 mm.) was determined.

(b) The part of the sample which is obtained after treatment (a) and which is free from dust still contains approximately 2% by weight of oil and contaminations removed from the oil is regenerated for 2 hours by heating to 500° C. while passing air through the mass. Treatment (a) is then employed again and the quantity of dust formed is determined.

(c) The sample obtained according to (b) is subsequently again regenerated for 2 hours, while passing air through the mass at 500° C., after which the cooled sample is kept for an hour in a cylindrical vessel which rotates at 25 r.p.m. The oil treatment is then again applied and the quantity of dust formed is determined.

The results are shown in Table I.

*Table I*

[Dust formed, percent by weight]

| Treatment | Sample | | | | | |
|---|---|---|---|---|---|---|
| | I | II | III | IV | V | VI |
| (a) | 0.00 | 4.8 | 2.3 | 0.2 | 0.1 | 0.05 |
| (b) | 0.01 | 0.1 | 0.17 | 0.14 | 0.04 | 0.03 |
| (c) | 0.2 | 0.7 | 1.20 | 0.6 | 0.5 | 0.3 |

The results of Table I show that the mechanical strength, indicated by the resistance to dust formation, of the particles obtained according to the present invention (sample Nos. I and VI) by far the greatest. Even after the drastic steam treatment (sample No. V) the mechanical strength is still outstanding and superior to that of fuller's earth (sample No. IV). As regards the results with untreated bauxite (sample No. II) it may be observed that the high figure (4.8) found after the first oil treatment is partly due to the dust (1.0% by weight) already present in the pores and the apparently aggressive effect of the hot oil on the surface. After treatment (b), less dust is formed from the untreated bauxite, but the weak structure of the latter is clearly demonstrated in treatment (c) in which the quantity of dust formed is considerably greater. Sample III is also found to be substantially inferior to the material prepared according to this invention.

A comparison of results of the treatment of samples I and VI shows that aluminum chloride reinforces the bauxite more than does aluminum nitrate, although bauxite treated according to the invention with the latter compound is considerably better than the products obtained by other processes.

The advantageous use of the adsorbents of the present invention in the adsorption refining of mineral oils has been demonstrated by the use of samples I, II and IV in decolorizing a Venezuelan lubricating oil raffinate obtained by extraction of a heavy distillate with furfural.

The sole figure in the accompanying drawing as stated previously is a schematic representation of the apparatus used to contact the oil with the various adsorbents under examination.

Referring to the drawing, the lubricating oil to be decolorized is pumped via line 1 into a stainless steel tube 2 which is 80 cm. long and 20 mm. in diameter and is surrounded by heating jacket 3 through which is pumped via line 4 a heating liquid which has a temperature of 170° C. and is drawn off from the jacket via line 5. The upper half of the tube 2 is filled with glass beads which serve to bring the oil being treated to a temperature of 170° C., and the adsorbent is in the lower half. During the test the level of the oil can be kept constantly at the level 7 in the top part of the tube 2 by means of valve 6.

The Venezuelan lubricating oil having a color 8 (ASTM method D155–45T, Union colorimeter) is pumped into the tube 2 at a rate of 200 cc. per hour. The color of the treated oil fractions drawn off via valve 6 is determined each time. The total quantity of oil which may be decolorized by the adsorbent to the desired ASTM color 7 is a measure of the decolorizing activity of the adsorbent. The results are shown in Table II.

The results given in Table II show that bauxite treated according to the invention with $AlCl_3$ (sample No. I) yields a quantity of oil of acceptable color, which, based on the volume of adsorbent tested is slightly greater than that of comparable color obtained with an unimpregnated bauxite (sample No. II) and considerably greater than that obtained with fuller's earth. This indicates that much smaller equipment with the use of bauxite is required to achieve a given processing capacity and furthermore, that the increase in mechanical strength of the

Table II

| Sample No. I | | | Sample No. II | | | Sample No. IV | | |
|---|---|---|---|---|---|---|---|---|
| Fraction No. | ASTM color of the fraction | Quantity of fraction, percent by vol. based on adsorbent | Fraction No. | ASTM color of the fraction | Quantity of fraction, percent by vol. based on adsorbent | Fraction No. | ASTM color of the fraction | Quantity of fraction, percent by vol. based on adsorbent |
| 1 | 4.5 | 80 | 1 | 4 minus | 72 | 1 | 2 plus | 60 |
| 2 | 6 plus | 79 | 2 | 5 minus | 68 | 2 | 4.5 | 60 |
| 3 | 6 minus | 74 | 3 | 6 minus | 73 | 3 | 7 plus | 59 |
| 4 | 6 | 78 | 4 | 7 minus | 73 | 4 | 8 minus | 59 |
| 5 | 7 | 79 | 5 | 7 plus | 76 | 5 | 8 | 59 |
| 6 | 7 | 74 | 6 | 7 plus | 73 | 6 | 8 plus | 62 |
| 7 | 7 | 70 | 7 | 7 plus | 72 | | | |
| 8 | 7 plus | 78 | 8 | 7 plus | 67 | | | |
| 9 | 7 plus | 69 | 9 | 8 minus | 66 | | | |
| 10 | 7 plus | 80 | 10 | 8 minus | 69 | | | |
| Average color | 6.5 | | | 7 minus | | | 7 minus | |
| Total oil treated, percent by vol. of adsorbent | | 761 | | | 709 | | | 359 | bauxite obtained by means of the process of this invention is not accompanied by any decrease in decolorizing activity.

We claim as our invention:

1. A process of decolorizing a hydrocarbon oil comprising contacting said oil with particles of an adsorbent prepared by adding to an uncalcined, non-activated alumina containing water of hydration and consisting essentially of particles of from 0.25 to 5 mm., an aqueous solution of an aluminum salt in an amount sufficient to substantially fill the pores of the alumina particles with aluminum salt without causing said particles to remain agglomerated on agitation, and heating the particles to a temperature above 200° C.

2. The process of claim 1 wherein the alumina to which the aqueous solution is added is a natural alumina containing 3 mols of water of hydration per mol $Al_2O_3$ and consists essentially of particles of 0.5 to 1.5 mm.

3. The process of claim 1 wherein the particles are dried at a temperature of 100–150° C. prior to being heated above 200° C., and the dried particles contain 0.2 to 0.6% of aluminum in the form of the added salt.

4. The process of claim 1 wherein an aqueous solution of aluminum chloride is added to the alumina particles which are then heated for a period at a temperature of from 200 to 300° C. and then for a period at a temperature from 400 to 800° C.

5. A method of preparing an improved adsorbent comprising adding to an uncalcined, non-activated alumina containing water of hydration, and consisting essentially of particles of from 0.25 to 5 mm., an aqueous solution of an aluminum salt in an amount sufficient to substantially fill the pores of the alumina particles with aluminum salt without causing said particles to remain agglomerated on agitation, and heating the particles to a temperature above 200° C.

6. The method of claim 5 wherein the alumina to which the aqueous solution is added is a natural alumina containing 3 mols of water of hydration per mol of $Al_2O_3$ and consists essentially of particles of 0.5 to 1.5 mm.

7. The method of claim 5 wherein the particles are dried at a temperature of 100–150° C. prior to being heated above 200° C. and the dried particles contain 0.2 to 0.6% of aluminum in the form of the added salt.

8. The method of claim 5 wherein an aqueous solution of aluminum chloride is added to the alumina particles which are then heated for a period at a temperature of from 200 to 300° C. and then for a period at a temperature from 400 to 800° C.

9. An improved adsorbent prepared according to the method of claim 5.

10. An improved adsorbent prepared according to the method of claim 6.

11. An improved adsorbent prepared according to the method of claim 7.

12. An improved adsorbent prepared according to the method of claim 8.

References Cited in the file of this patent

UNITED STATES PATENTS

| 2,277,512 | De Simo | Mar. 24, 1942 |
| 2,316,954 | Hancock | Apr. 20, 1943 |
| 2,390,917 | Breth et al. | Dec. 11, 1945 |
| 2,662,860 | Engel et al. | Dec. 15, 1953 |
| 2,892,799 | Brennan et al. | June 30, 1959 |

FOREIGN PATENTS

| 445,727 | Great Britain | Apr. 17, 1936 |